United States Patent [19]
Caughlin et al.

[11] B 3,914,739
[45] Oct. 21, 1975

[54] VEHICLE BRAKE AND INDICATOR LIGHT CONTROL SYSTEM

[75] Inventors: James Daniel Caughlin; William John Ozeroff, both of La Jolla, Calif.

[73] Assignee: James Daniel Caughlin, La Jolla, Calif.

[22] Filed: Jan. 31, 1972

[21] Appl. No.: 222,188

[44] Published under the Trial Voluntary Protest Program on January 28, 1975 as document no. B 222,188.

[52] U.S. Cl..................... 340/72; 340/67; 340/81 R
[51] Int. Cl.² ........................................... B60q 1/26
[58] Field of Search ............ 340/54, 55, 56, 66, 67, 340/71, 72, 81 R, 322, 377, 68

[56]         References Cited
         UNITED STATES PATENTS
2,098,742   11/1937   Curtiss ................................. 340/56
3,555,507   1/1971   Burson .............................. 340/56 X
3,576,527   4/1971   Howard ................................ 340/67

Primary Examiner—Donald J. Yusko
Attorney, Agent, or Firm—Brown & Martin

[57]         ABSTRACT

A light control system for vehicle brake lights that functions to blink the brake lights a number of times, such as three, upon applying the brakes and then holds the brake lights in the on condition as long as the brakes are held on. The control system uses a pulse counting arrangement, in which the light system is normally on, but is turned off successively with the count and then is held in the on condition. The control system is used with existing cars with existing turn indicator switch arrangements or can be used as original equipment on vehicles where the pulsing mechanism functions as the turn indicator flasher circuit.

5 Claims, 3 Drawing Figures

VEHICLE BRAKE AND INDICATOR LIGHT CONTROL SYSTEM

BACKGROUND OF THE INVENTION

There are many different types of systems for controlling the brake lights on vehicles. In the generally accepted system, the brake lights are turned on at the taillights when the brakes are applied and are held on until the brakes are released. The problem with this arrangement is that when the brake lights go on, the additional light merely increases the overall intensity of the taillights. Thus after the brake lights have been on for some period of time, other drivers have difficulty in distinguishing between whether the brake lights are on or not, even though the brakes are released and reapplied. Also after driving in traffic for long periods of time, drivers often do not readily recognize the increased taillight intensity, when the brakes are applied in another car. Thus a following car can rapidly approach another car, and even though the car in front has its brakes applied, it may take the driver of the following car a split second delay of recognition and awareness that can result in a rear end collision.

Thus it is advantageous to have a system that will blink the taillights a predetermined number of times prior to holding the stop lights in the on condition, and yet operates in connection with existing turn signal switch arrangements in existing cars, and as original equipment by functioning as the turn indicator flasher unit, and which system maintains failsafe operation so that upon failure of the system, the taillights will normally be in the energized condition.

SUMMARY OF THE INVENTION

In a preferred embodiment of this invention, the stop lights of a vehicle are turned on through the normal brake operated electrical switch. This switch energizes a transistor circuit that in turn switches the battery power to the brake lights circuit. In this system, a means for providing predetermined timed pulses of opposite polarity is supplied to a counter. The counter in turn provides output levels that with the timed pulse levels, gates the switch circuit in the brake lights power circuit.

The supply of timed pulses is provided by a multivibrator circuit that in one condition on one side provides output pulses to the gate circuit or first gate circuit and in the second condition, sends out pulses through a second gate circuit to the counter, which is also gated by the output condition of the counter. The counter after a given number of counts, locks in the hold condition that holds the stop lights on.

In initial operation, the circuit feeds a reset signal to the counter, resetting the counter for subsequent operation. Thus the control circuit may be interrupted at any particular time, and re-initiated by opening and closing the brake switch, as the reset circuit merely resets the counter to the initial zero count condition.

The brake and indicator light system can be easily employed in existing cars with the existing turn indicator switching arrangements with the turn indicator flasher circuit. Also the system can be used in original car installations where the counter circuit is switched off, and the pulse source or multivibrator circuit is used to supply successive levels to the output circuits to provide the flashing power to the turn indicator lamps.

It is therefore an object of this invention to provide a new and improved means for controlling the illumination of stop light signals on vehicles upon the application of the brakes.

Many other advantages and objects of this invention will become more apparent upon a reading of the following detailed description and an examination of the drawing wherein like reference numerals designate like parts throughout and in which.

Figure 1:
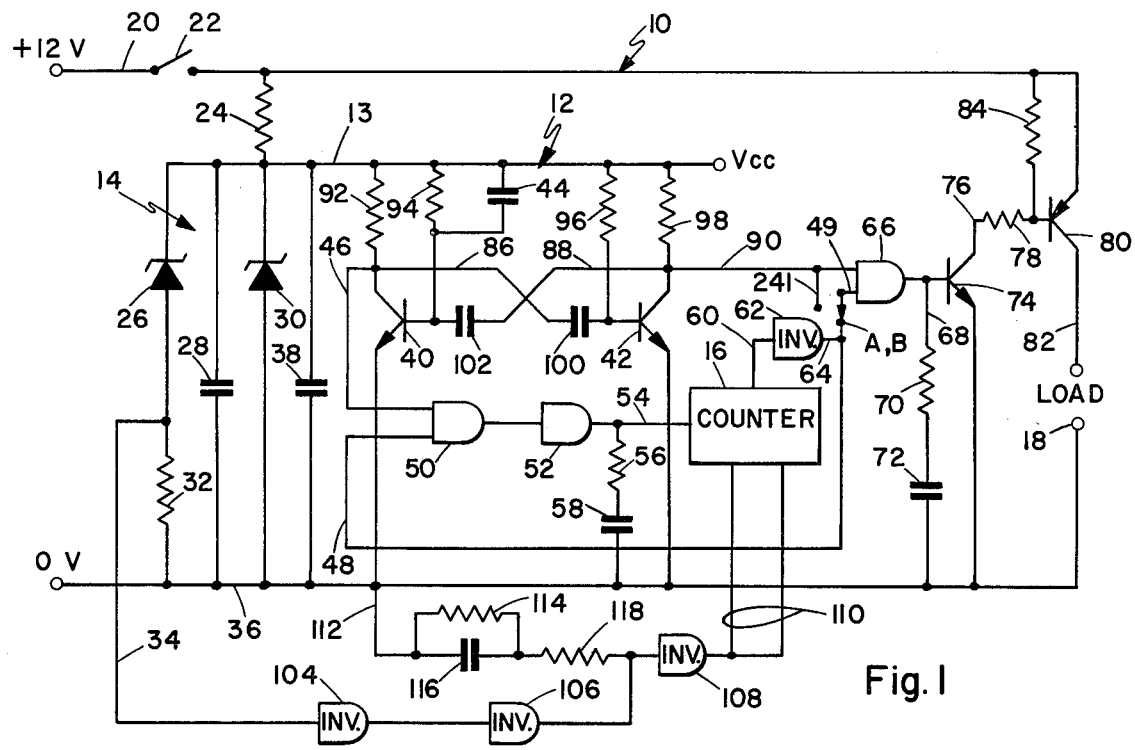
FIG. 1 is a schematic and block diagram of an embodiment of the brake and indicator light control system of this invention.

Referring now to the drawings and specifically to FIG. 1, power from for example a 12 volt battery source is supplied through line 20 and through brake switch 22. Transistors 80 and 74 act as a switch to supply current to the load 18. When brake switch 22 is closed, transistor 80 is initially in the cut-off state. The biasing circuit through resistor 84 carries no current since transistor 74 is cut-off by the O output of NAND gate 66. NAND gate 66 at this time has a 1 input on line 49 and also on line 90. When the multivibrator circuit 12 flips, as will be subsequently explained, transistor 42 conducts, line 90 provides O input to NAND 66, and transistor 74 is fired by the 1 output of NAND 66. This in turn fires power transistor 80 which supplies power to the load 18, which is the brake lights. As long as NAND gate 66 has a 1 input on line 49, it will pass the successive 0 and 1 inputs on line 90 from the multivibrator 12, turning the brake lights on and off. We now turn to the action of the counter and the multivibrator 12.

Upon closing switch 22, power is also provided through resistor 24 to the brake and indicator light control system 10 that provides voltage $V_{cc}$ in line 13 that is the power for the control circuit. Transistors 40 and 42 as well as capacitors 102 and 100 and resistors 92, 94, 96 and 98 form a multivibrator circuit 12. Capacitor 44 ensures that the vibrator circuit fires first through transistor 40. In operation, when transistor 40 is energized, it provides a negative or 0 output pulse through line 46 to NAND gate 50. NAND gate 50 initially sees a positive or 1 signal in line 48. Thus it supplies a 1 signal through double inverter gate 52 that supplies a 0 pulse in line 54 to the counter 16. Counter 16, that may be any suitable counter capable of counting to three counts and may comprise a known flip flop counter circuit, counts the gated input signal and also provides an output signal on the third count in line 60 that is positive or 1. The counter 16 output is made 0 initially by lines 110 when the switch 22 is closed. It is this resetting of the counter 16 which provides 1 inputs at lines 48 and 49, which open gates 50 and 66. Inverter 62 inverts the signal to a 0 output signal in line 64 that is fed to gate 66, closing it, and through line 48 back to gate 50, closing NAND gate 50. This closing of NAND gates 50 and 66 will occur only after the multivibrator 12 has flipped three times, as it must in order to provide 1 output from the counter on line 60. The counter is set to register the change in voltage on line 46 from positive to negative. No count is registered the first time transistor 40 conducts, since line 46 goes to the negative state on closing the switch 22. Before the first flip of the multivibrator, transistor 41 is de-energized providing a 1 output condition in line 90 to NAND gate 66. NAND gate 66 in turn provides a 0 signal to transistor 74, that closes transistor 74. This prohibits current to line 76 and resistor 78, does not allow transistor 80 to conduct, and keeps power off the light circuit load 18.

The brake light indicator system 10 holds the "lights off" condition during the time that transistor 40 is energized and transistor 42 is de-energized.

The initial negative voltage on line 86 of multivibrator 12 eventually builds up a sufficient charge in capacitor 100 to produce a positive bias on the base of transistor 42, energizing transistor 42. This supplies a 0 output pulse in line 90 to NAND gate 66. The negative 0 pulse in line 90 plus the 1 pulse in line 64 gives NAND gate 66 1 output to the base of transistor 74, energizing transistor 74. This in turn energizes transistor 80 closing the power circuit to the brake light circuit 18 and turning on the brake signal lights.

In this condition, line 48 has a 1 level. After the brake lights have been turned on for the period of time set by the multi-vibrator 12, then line 88 charges capacitor 102 sufficiently to drive the base of transistor 40 positive, firing transistor 40 and supplying a 0 output pulse through line 46 to NAND gate 50. This pulse is registered on the counter 16. Thus the multivibrator circuit 12 in its alternative conditions, successively provides controlled timed pulses to counter 16 through gate 50 and functions with the output of the other side of the multivibrator circuit to turn the brake lights off and on through gate 66. This continues through three counts at which time and condition, the counter output changes from 0 to 1 on line 60. This gives a 0 on line 49, closing NAND gates 66 and 50, leaving a 1 output on line 68. In this condition, transistor 74 is energized and transistor 80 is energized holding the lights in the "on" conditon. Thus circuit 10 functions to de-energize the normally energized brake lights in three successive time intervals of the multivibrator, and then the brake lights are held in the on condition by the closing of gates 50 and 66. The multivibrator circuit 12 sets the time intervals for which the brake lights are turned on, and then turned off by the multivibrator circuit.

In the circuit of FIG. 1, resistor 24, zener diode 30 and capacitor 38 function to provide the 5 volt $V_{cc}$ power supply for the control circuit. Zener diode 26, capacitor 28 and resistor 32 provide a reset voltage through line 34 and lines 110 to the counter 16. Inverters 104, 106 and 108 function to clean up the input signal, and set the level of the input signal to the counter 16. The filter circuit comprising resistor 114, capacitor 116 and resistor 118 filters the reset signal to also clean up the signal. Resistor 56 and capacitor 58 form a filter circuit as does resistor 70 and capacitor 72 in line 68.

In use, the brake and indicator light control system as described and illustrated in FIG. 1, may be used either to control the brake lights only, wherein the turn signals on the vehicle are controlled by normal flasher units or may be employed to control the brake lights both during braking and during turning by employing the multivibrator circuit portion of the brake and indicator light control system to also control and flash the lights under turn indicator conditions.

Figure 2:
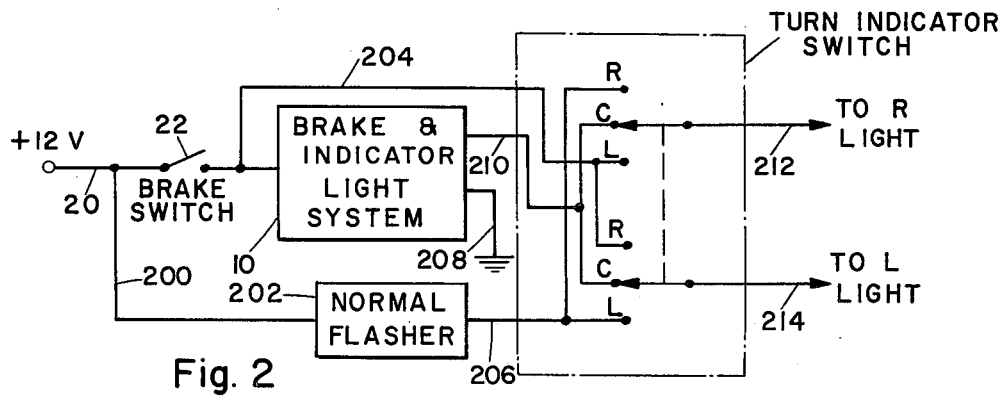
FIG. 2 is a block diagram of the electrical connection of the brake and indicator light control system in a vehicle light system having a normal flasher circuit for flashing turn indicator lights.

FIG. 2 illustrates the use of the brake and indicator light control system 10 for controlling the brake lights under braking conditions only. In this system, a power source such as a 12 volt battery, supplies power both to the control system 10 and to a normal flasher circuit 202. In operation of the flasher circuit, the flasher circuit conveys pulsing power through line 206 to the respective right and left lights through the turn indicator switch. Accordingly when the turn indicator switch is to indicate a right turn, then the right light or R light or switch connects line 206 to line 212. Also the left light is connected through line 214, R switch for the L light, and through line 204 to line 20. Thus should the brakes be applied, while the turn indicator switch is in operation, then brake switch 22 is closed and direct power is applied holding the left light illuminated indicating a braking condition. Since the brake and indicator light system 10 is only connected to the right and left lights through the center or C switches, the brake and indicator light system is not operative when the vehicle's turn signals are switched on.

When the turn indicator light switch is positioned in the C switch condition, and when the brakes are applied thus closing switch 22, power is supplied through line 20 to the brake and indicator light control system 10 that connects the right and left lights through line 210 and ground 208 to the system 10 that successively blinks or flashes the taillights three times and then holds the taillights in the on condition during braking.

Figure 3:
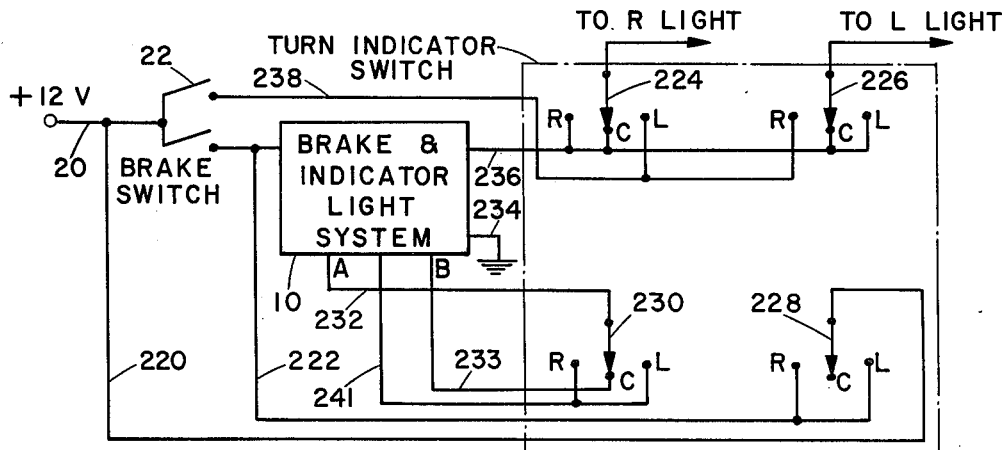
FIG. 3 is a block diagram of the use of the brake and indicator light control system with turn indicator light switches in a vehicle light system where the brake and indicator light control devices provide the flashing of the turn signals.

Referring to FIG. 3, the turn indicator switch has two separate switch mechanisms that operate between positions right, left and center for both the right light and the left light. When the turn indicator switch is in the center or C position, then the turn indicator switch is not in operation, and the brake lights are controlled by the brake and indicator light system 10 in the following manner. When the brake switch 22 is closed, power is supplied from the 12 volt battery source through line 20 to the control system 10 and through line 236 and center switches C to the right and left lights. Thus the lights are blinked by the control system 10 three times and then the stop lights are held in the on position. While power is also connected to line 238, the turn indicator switch is not connected to this circuit. Also line 233 is connected to line 232 closing the open circuit A, B, as will be described in more detail hereinafter.

When the vehicle or car is making a left turn, then each of switches 224, 226, 228 and 230 are moved to the L switch position. In this position, the brake switch 22 is open, however power is supplied through line 220, switch 228, line 222 and line 20 to the brake and indicator light control system 10. This supplies off and on voltage pulses through line 236 to the left light through the L switch connection of switch 226.

In accomplishing this, the line circuit marked A, B. in FIG. 1 is open, and line 49 is connected to line 90 through switch 230 of FIG. 3. Thus line 232 must be connected to line 233 through switch 230, or the counter control portion of the brake and indicator light control system 10 of the circuit of FIG. 1 is shut off. It may be understood that by opening the circuit A, B. in FIG. 1, and connecting line segment 49 to line 90, gate 66 sees both negative pulses and positive pulses for each condition of the output in line 90 of the multivibrator 12. Thus the base of transistor 74 is alternately driven positive and negative and transistor switch 80 is alternately energized and de-energized. This provides uninterrupted flashing voltages to the right and left lights as determined by the position of switches 224, 226, 228 and 230.

Having described our invention, we now claim.

1. In a vehicle brake and indicator light control system, a first electrical circuit for energizing signal lights, first and second switch means in said first electrical circuit, said first switch means closing said first electrical circuit and energizing said signal lights in response to actuating the vehicle's brakes, said second switch means opening said first electrical circuit and de-energizing said signal lights upon being de-energized, a source of timed pulses, second circuit means responsive to said closing of said first switch means for initating timed pulses from said source, counter means for counting said timed pulses and providing output pulses in response to counting said timed pulses and a steady state output signal after counting a given number of said pulses, gate means responsive to said timed pulses and said output pulses for providing an output signal to said second switch means energizing and deenergizing said second switch means and said signal lights, and said gate means being responsive to said steady state output signal for energizing said second switch means closing said first electrical circuit.

2. In a vehicle brake and indicator light control system as claimed in claim 1 including, said source of timed pulses providing pulses of opposite polarities in first and second lines simultaneously, said times pulses supplies to said gate means having a first polarity in said first line, second gate means responsive to said timed pulses of the second polarity in said second line and to said output pulses of said counter means for gating said timed pulses of said second line to said counter means for counting, and said second gate means only passing a pulse to be counted upon said timed pulse in said second line and said counter output pulse having substantially the same level and polarity.

3. In a vehicle brake and indicator light control system as claimed in claim 1 including, said signal lights comprising right and left brake lights, flasher circuit for providing flasher pulsed power output, turn indicator switch means for disconnecting said first electrical circuit from said signal lights and for switching said flasher power output to the right or left brake light for turn indication, and means for connecting a steady power output to the opposite brake light to the brake light to which said flasher power output is being supplied.

4. In a vehicle brake and indicator light control system as claimed in claim 2 in which, said source of timed pulses comprising a multivibrator that simultaneously provides output pulses of different polarities or levels with one of said multivibrator outputs comprising said first timed pulses to said gate means and the other of said outputs comprising said second timed pulses supplied to said second gate means.

5. In a vehicle brake and indicator light control system as claimed in claim 1 including, said signal lights comprising right and left brake lights, and turn indicator switch means for switching said first electrical circuit to the right or left brake lights.

* * * * *